(12) United States Patent
Serr et al.

(10) Patent No.: US 7,739,333 B2
(45) Date of Patent: Jun. 15, 2010

(54) MANAGEMENT OF ORGANIZATIONAL BOUNDARIES IN UNIFIED COMMUNICATIONS SYSTEMS

(75) Inventors: Robert W. Serr, Kirkland, WA (US); Scott Alan Huddleston, Redmond, WA (US); Jason Hendrick Bubolz, Seattle, WA (US); Mark D. McClelland, Seattle, WA (US); Mark Madsen, Morton Grove, WA (US)

(73) Assignee: Microsoft Corporation, Redmond, WA (US)

( * ) Notice: Subject to any disclaimer, the term of this patent is extended or adjusted under 35 U.S.C. 154(b) by 207 days.

(21) Appl. No.: 12/163,308

(22) Filed: Jun. 27, 2008

(65) Prior Publication Data

US 2009/0327419 A1 Dec. 31, 2009

(51) Int. Cl.
*G06F 15/16* (2006.01)
(52) U.S. Cl. .................. 709/205; 709/203; 709/201; 714/39; 370/335
(58) Field of Classification Search ............. 709/205, 709/201, 203; 370/335; 714/39
See application file for complete search history.

(56) References Cited

U.S. PATENT DOCUMENTS

| | | | |
|---|---|---|---|
| 5,949,414 | A | 9/1999 | Namikata |
| 6,625,652 | B1 | 9/2003 | Miller |
| 6,704,769 | B1 | 3/2004 | Comstock |
| 7,546,335 | B2 * | 6/2009 | Moeller et al. ............ 709/201 |
| 2002/0034164 | A1 | 3/2002 | Sjoholm |
| 2006/0107221 | A1 | 5/2006 | Haug |
| 2006/0165040 | A1 * | 7/2006 | Rathod et al. ............ 370/335 |
| 2006/0218000 | A1 * | 9/2006 | Smith et al. ............ 705/1 |
| 2007/0156695 | A1 | 7/2007 | Lim |
| 2007/0185957 | A1 | 8/2007 | Mandalia |
| 2007/0250569 | A1 | 10/2007 | Mutikainen |
| 2008/0040189 | A1 | 2/2008 | Tong |

OTHER PUBLICATIONS

FlashPioneer Web Conferencing Chat 1.7 Build 80108, accessed at: http://www.redsofts.com/soft/214/76037/FlashPioneer_Web_Conferencing_Chat.html; date accessed Apr. 21, 2008, 2 pages.
Turoff et al.; Collaborative Discourse Structures in Computer Mediated Group Communications, Copyright © 1999, 13 pages.
Pimplapure, Ashish; Virtual Groups: A Web Based Electronic Conferencing System for Online Education, 1992, 77 pages.
Tham et al.; A Distributed Peer-to-Peer Platform for Synchronized Group Collaboration and Knowledge Sharing, accessed at http://thamjoyew.tripod.com/papers/DCABES2004_DistP2Pplatform.pdf; date accessed May 13, 2008, 6 pages.

* cited by examiner

*Primary Examiner*—Tammy T Nguyen
(74) *Attorney, Agent, or Firm*—Merchant & Gould P.C.

(57) ABSTRACT

In general, this disclosure describes techniques of controlling communications occurring in a unified communications system. As described herein, a directory is established at a server system that hosts the unified communications system. The directory includes a plurality of hierarchically-organized categories. Each category specifies a set of users. One or more conferences may be associated with each of the categories. All communications occurring in the unified communications system occur within the context of one of the conferences. A user can only communicate within a conference if the conference is associated with the category that specifies a set of users that includes the user. By appropriately structuring the categories in the directory and the sets of users specified by the categories, the techniques of this disclosure may serve to prevent a user from using the unified communications system to communicate with certain other individuals.

13 Claims, 7 Drawing Sheets

MANAGEMENT OF ORGANIZATIONAL BOUNDARIES IN UNIFIED COMMUNICATIONS SYSTEMS

BACKGROUND

Today's complex business environment frequently gives rise to conflicts of interest between divisions of an organization. For instance, conflicts of interest may arise when an auditing division of an organization interacts closely with a consulting division of the organization. In a second instance, conflicts of interest may arise when an investment advising division of an organization interacts closely with an investment management division of the organization. In a third instance, conflicts of interest may arise when a first attorney at a law firm previously represented a first client whose interests are opposed to the interests of a second client who is now being represented by a second attorney at the same law firm.

Ethical guidelines frequently recommend the use of "ethical walls" between divisions of an organization to prevent conflicts of interest that may arise when such divisions interact closely. When an ethical wall is used, people in such divisions of the organization are forbidden to communicate on matters that could lead to a conflict of interest. For instance, in the third instance given above, an ethical wall would prevent the first attorney from communicating with the second attorney about the first client and would prevent the second attorney from communicating with the first attorney about the second client.

SUMMARY

In general, this disclosure describes techniques of controlling communications occurring in a unified communications system. As described herein, a directory is established at a server system that hosts the unified communications system. The directory includes a plurality of hierarchically-organized categories. Each category specifies a set of users. One or more conferences may be associated with each of the categories. All communications occurring in the unified communications system occur within the context of one of the conferences. A user can only communicate within a conference if the conference is associated with a category that specifies a set of users that includes the user. By appropriately structuring the categories in the directory and by appropriately configuring the sets of users specified by the categories, the techniques of this disclosure may serve to prevent a user from using the unified communications system to communicate with certain other individuals. In this way, the techniques of this disclosure may enable an organization to enforce ethical walls or otherwise manage communications in a unified communications system across organizational boundaries.

Preventing individuals from using a unified communications system to communicate with certain other individuals may be useful in a variety of contexts. For example, a financial institution may have an investment division and a research division. The investment division may manage investments on behalf of the financial institution and the research division may provide investment research to customers of the financial institution. In this example, conflicts of interest would arise if people in the investment division could freely communicate with people in the research division. For instance, people in the investment division could persuade people in the research division to provide inaccurate research in order to enhance the financial institution's investments. In this example, the directory may include an "investments" category and a "research" category that are children of a "root" category. The "root" category may specify a set of users that includes all individuals in the financial institution. The "investments" category may specify a set of users that includes all individuals in the investment division and the "research" category may specify a set of users that includes all individuals in the research division. In this example, individuals in the investment division can only communicate in conferences associated with the "investments" category or the "root" category. Individuals in the "research" category can only communicate in conferences associated with the "research" category or the "root" category.

The techniques of this disclosure may be conceptualized in several ways. For instance, the techniques of this disclosure may be conceptualized as a method that comprises establishing, at a server system, a directory that includes a plurality of categories that are organized as a hierarchy. In this method each category specifies a set of users, wherein for each category in the plurality of categories other than a root category, the set of users specified by the category is a subset of the set of users specified by the category's parent category. The method also comprises associating a conference with a first category in the plurality of categories. Furthermore, the method comprises after associating the conference with the first category, determining, at the server system, whether a user is in the set of users specified by the first category. The method also comprises sending conference information to a client device used by the user only when it is determined that the user is in the set of users specified by the first category, the conference information enabling the client device to join the conference.

In another example, the techniques of this disclosure may be conceptualized as a device comprising a conference request module that receives from a server system a list of conferences that are associated with categories that specify sets of users that include a user of the device. The categories are hierarchically-arranged entries in a directory. Furthermore, each of the categories specifies a set of users. For each of the categories other than a root category, the set of users specified by the category is a subset of the set of users specified by the category's parent category. The device also comprises a join request module that sends to the server system a request to join a selected conference associated with a first one of the categories. In addition, the device comprises a conference module that enables the user of the device to communicate with other users in the selected conference when the server system determines that the first one of the categories specifies a set of users that includes the user of the device.

In another example, the techniques of this disclosure may be conceptualized as a computer-readable storage medium comprising instructions that, when executed, cause a computer system to receive a registration request from a first client device, the registration request specifying an identification credential of a first user. In addition, the instructions cause the computer system to determine whether the identification credential of the first user is valid. The instructions also cause the computer system to register the first user as a user of the first client device when it is determined that the identification credential of the first user is valid. Furthermore, the instructions cause the computer system to receive, after the first user is registered as the user of the first client device, a request from the first client device for a list of unified communications conferences that the first user is allowed to join. In addition, the instructions cause the computer system to identify, in response to receiving the request for the list of unified communications conferences that the first user is allowed to join, categories in a directory that have scope properties that specify sets of users that include the first user. The categories in the directory are organized as a hierarchy. For each category in the plurality of categories other than a root category, the set of users specified by the category is a subset of the set of users specified by the category's parent category. The instructions also cause the computer system to identify unified communications conferences that are included in the identified categories and that have user lists that include the first user. For each of the unified communications conferences, the user list of the unified communications conference is a subset of the set of users specified by the category that includes the unified communications conference. The instructions also cause the computer system to include the identified unified communications conference in a list of unified communications conferences that the first user is allowed to join when the first user is in the set of users specified by the first category. Further, the instructions cause the computer system to send to the first client device the list of the unified communications conferences that the first user is allowed to join. In addition, the instructions cause the computer system to receive, from the first client device, a request to join a selected unified communications conference in a first category in the plurality of categories. The instructions also cause the computer system to determine, in response to the request to join the selected unified communications conference, whether the first user is in the set of users specified by the first category and whether the first user is in the user list of the selected unified communications conference. In addition, the instructions cause the computer system to send conference information to the first client device when it is determined that the first user is in the set of users specified by the first category and that the first user is in the user list of the selected unified communications conference, the conference information enabling the first client device to join the selected unified communications conference, thereby enabling the first user to communicate in the selected unified communications conference. Further, the instructions cause the computer system to send to the first client device a list of users that are in the set of users specified by the first category, the list of users including a second user. In addition, the instructions cause the computer system to receive, from the first client device, a request to invite the second user to join the selected unified communications conference. The instructions also cause the computer system to identify a second client device as a client device used by the second user. Furthermore, the instructions cause the computer system to send to the second client device an invitation to join the selected unified communications conference. The instructions also cause the computer system to receive, from the second client device, an invitation response. In addition, the instructions cause the computer system to determine whether the invitation response indicates that the second user has accepted the invitation. The instructions also cause the computer system to send the conference information to the second client device, thereby enabling the second user to communicate in the selected unified communications conference.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
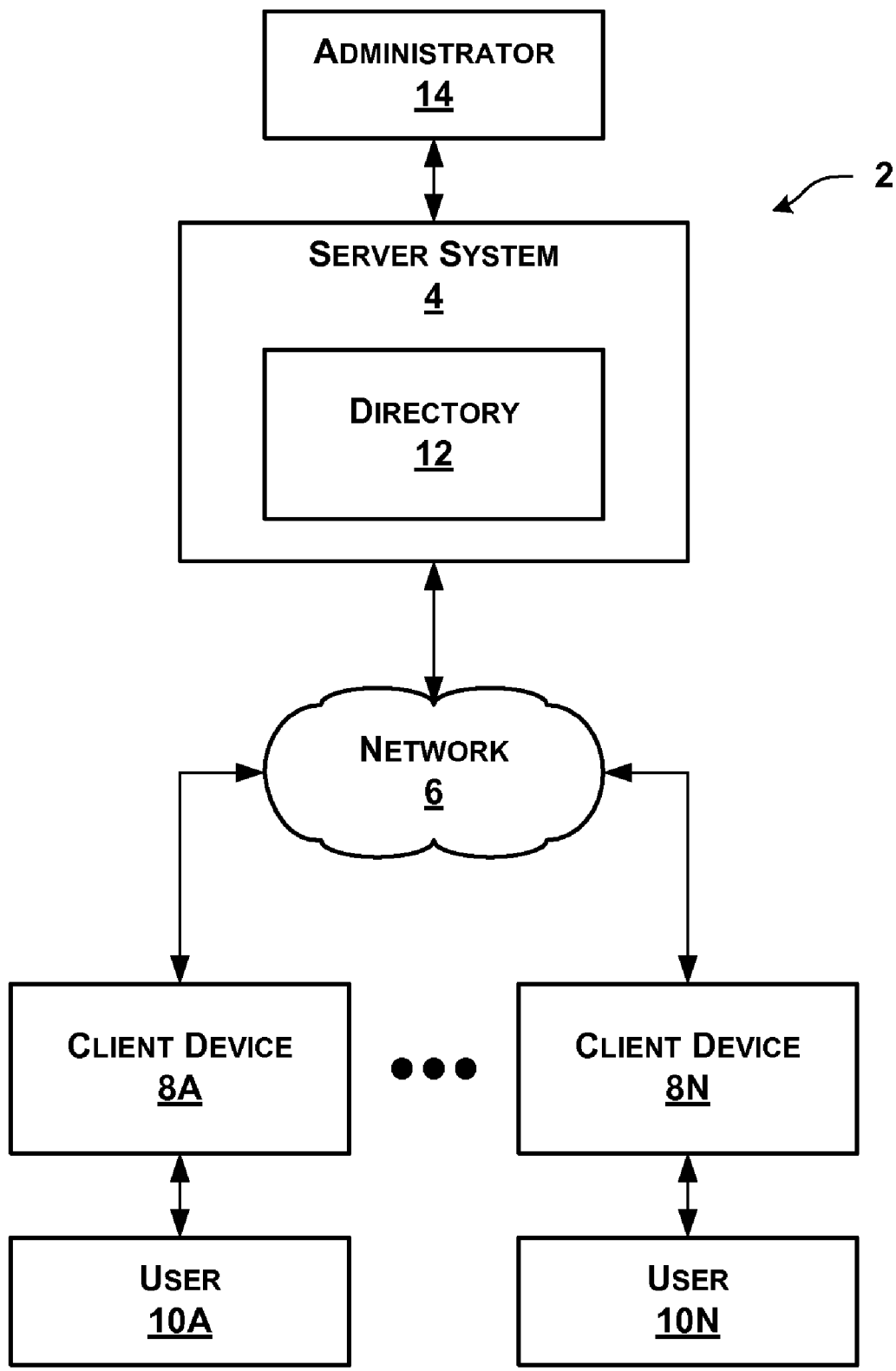
FIG. 1 is a block diagram illustrating an example communications system.

FIG. 1 is a block diagram illustrating an example communications system 2. In the example of FIG. 1, communication system 2 includes a server system 4, a network 6, and a plurality of client devices 8A through 8N (collectively, "client devices 8"). A plurality of users 10A through 10N (collectively, "users 10") use respective ones of client devices 8.

Server system 4 may be a wide variety of different types of devices. For instance, server system 4 may be a standalone server, a personal computer, a server blade, a mainframe computer, a supercomputer, or another type of computing device. In other instances, server system 4 may include multiple computers that operate to provide the functionality of server system 4. For instance, server system 4 may include a set of computers operating as a cluster, a set of computers operating as a data center, or a set of computers operating in another type of configuration to provide the functionality of server system 4.

Network 6 may include one or more types of network. For instance, network 6 may include a local area network, a wide area network (e.g., the Internet), a global area network, a metropolitan area network, a public switched telephone network, and/or another type of network. Network 6 may include many network devices and many network links. The network devices in network 6 may include bridges, hubs, switches, firewalls, routers, load balancers, and other types of network devices. The network links in network 6 may include wired links (e.g., coaxial cable, fiber optic cable, 10BASE-T cable, 100BASE-TX cable, etc.) and may include wireless links (e.g., WiFi links, WiMax links, wireless broadband links, mobile telephone links, Bluetooth links, infrared links, etc.).

Client devices 8 may be a wide variety of different types of devices. For example, one or more of client devices 8 may be personal computers, mobile telephones, personal media players, smart phones, television set-top boxes, personal digital assistants, devices integrated into vehicles, mainframe computers, computer workstations, standalone servers, server blades, server farms, game platforms, or one or more other types of devices. In some implementations, client devices 8 may include two or more separate devices that logically have the functionality of a client device.

Server system 4 includes a directory 12. Directory 12 includes a plurality of categories that are organized as a hierarchy. In one example implementation, each category in directory 12 may correspond to a subdivision of an organization, such as a business enterprise, a governmental organization, a non-profit organization, or another type of organization. Directory 12 may be implemented in a variety of ways. For example, directory 12 may be implemented as a Lightweight Directory Access Protocol (LDAP) directory. In this example, each category in directory 12 may be an entry in the LDAP directory.

One or more conferences may be associated with each category in directory 12. For example, a first conference may be associated with a category that corresponds to an "Accounting" subdivision of an organization and a second conference may be associated with a category that corresponds to a "Marketing" subdivision of the organization. In the example in which directory 12 is implemented as a LDAP directory, each conference may be an entry in the LDAP directory.

As used in this disclosure, a "conference" may be conceptualized as a virtual conference room in which individuals can meet to communicate with one another. Like in a real conference room, a variety of different types of communication may occur within a conference. In other words, users 10 may be able to communicate with other ones of users 10 in a conference using multiple media. For instance, just as individuals can speak to one another in a real conference room, individuals may be able to speak to one another in a conference. Furthermore, just as individuals can see one another in a real conference room, individuals may be able to see one another in a conference. Just as individuals could exchange written messages in a real conference room, individuals may be able to exchange written messages in a conference. Multiple individuals can communicate simultaneously in a conference. For example, five individuals can communicate with each other in a conference.

Each category in directory 12 specifies a set of users. For instance, each category in directory 12 may be associated with a scope property that specifies a set of users. The sets of users specified by the categories in directory 12 have the property that, for each category x except for a root category, the set of users specified by category x is a subset of the set of users specified by the parent category of category x. For example, the parent category of category x may specify a set of users that consists of users 10A, 10B, and 10C. In this example, category x may validly specify a set of users that consists of users 10A and 10B because users 10A and 10B constitute a subset of the set of users specified by the parent category of category x. However, in this example, category x may not validly specify a set of users that consists of users 10A and 10D because users 10A and 10D do not constitute of a subset of the set of users specified by the parent category of category x.

The scope property of a category in directory 12 may specify a set of users in a variety of ways. For instance, the scope property of a category in directory 12 may specify all users of client devices that are in a particular domain. In another instance, the scope property of a category in directory 12 may specify a federated group that includes an arbitrary collection of users.

A user who manages a conference (i.e., the "manager" of the conference) may establish a user list for the conference. The user list for the conference can only include users who are in the set of users specified by the scope property of the category that contains the conference. However, the manager of the conference can limit the user list for the conference to a subset of the set of users specified by the scope property of the category that contains the conference. For example, the set of users specified by the scope property of the conference may be limited to user 10A, user 10B, and user 10C. In this example, the manager of the conference can limit the user list for the conference to user 10A and user 10B.

When a user (e.g., user 10A) wants to communicate with another user, user 10A instructs client device 8A to send a request for a list of conferences to server system 4. In response to the request for the list of conferences, server system 4 uses directory 12 to identify categories that have scope properties that specify sets of users that include user 10A. After identifying the categories that have scope properties that specify sets of users that include user 10A, server system 4 may identify conferences in the identified categories that have user lists that include user 10A. After identifying the conferences, server system 4 sends a list of the identified conferences to client device 8A. Client device 8A then presents the list of the identified conferences.

User 10A may then select one of the conferences from the list of the identified conferences. When user 10A selects one of the conferences from the list of the identified conferences, client device 8A sends to server system 4 a request to join the selected conference. Upon receiving the request to join the selected conference, server system 4 may verify that the scope property of the category that contains the selected conference specifies a set of users that includes user 10A and that the user list of the selected conference includes user 10A. If server system 4 successfully verifies that the scope property of the category that contains the selected conference specifies a set of users that includes user 10A and that the user list of the selected conference includes user 10A, server system 4 sends conference information to the client device. The conference information enables client device 8A to communicate in the selected conference. If server system 4 fails to successfully verify that the scope property of the selected conference specifies a set of users that includes user 10A, server system 4 rejects the request to join the selected conference and does not send the conference information to client device 8A.

When client device 8A receives the conference information from server system 4, client device 8A may launch a communications application that enables the user to participate in the selected conference. For instance, client device 8A may launch a Microsoft Group Chat communications application, a Microsoft Office Communicator communications application, an instant messaging application, a video conferencing application, a voice telephony application, or another type of communications application. In this way, user 10A effectively joins the selected conference.

User 10A may invite other users to join a particular conference. To enable user 10A to invite others to join the particular conference, client device 8A may send to server system 4 a request for a list of users who are allowed to participate in the particular conference. Upon receiving the request for the list of users who are allowed to participate in the particular conference, server system 4 identifies users included in the set of users specified by the scope property of a category that contains the particular conference and that are included in the user list of the particular conference. Server system 4 may then send the list of the identified users to client device 8A.

In addition to simply sending the names of the identified users, server system 4 may send to client device 8A presence information regarding the identified users. The presence information regarding a user may indicate whether the user is available to participate in a conference. For example, the presence information regarding a user may indicate that the user is currently "available", "busy", "away", "unavailable", and so on.

When client device 8A receives the list of the identified users, client device 8A may display the list of the identified users. User 10A may then invite a user to join the particular conference by selecting a user from the list of the identified users. When user 10A selects a user from the list of the identified users, client device 8A may send a request to server system 4 to invite the selected user to join the particular conference.

It should be appreciated that, while the above description of FIG. 1 referred to communications between server system 4 and client device 8A, this description may be applicable to any of client devices 8 and users 10.

Figure 2:
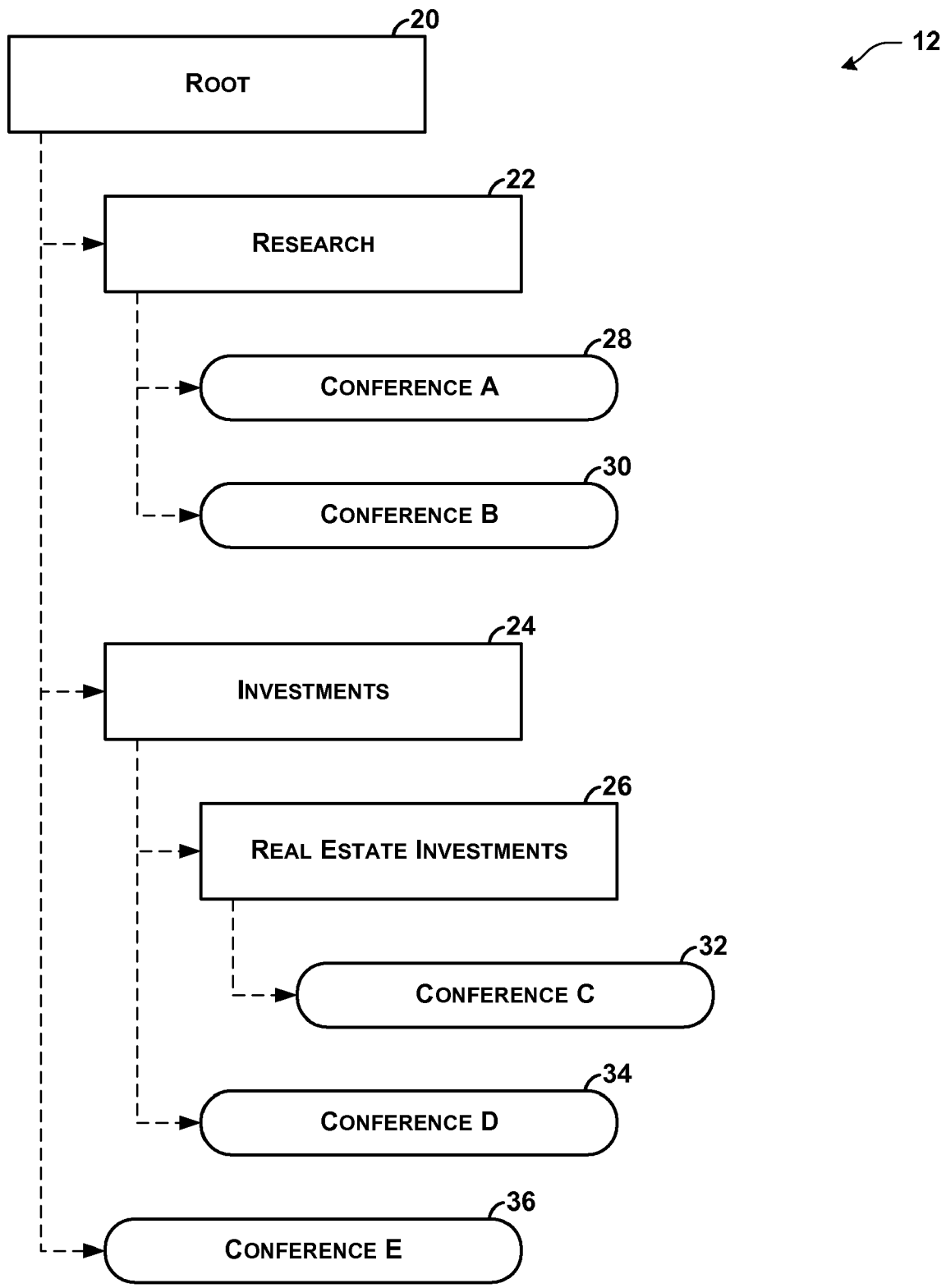
FIG. 2 illustrates a first example instance of a directory.

FIG. 2 illustrates a first example instance of directory 12. As illustrated in the example of FIG. 2, boxes with square corners represent categories and boxes with rounded corners represent conversations.

In the example of FIG. 2, directory 12 includes a "Root" category 20. "Root" category 20 is the root category of directory 12 because "Root" category 20 has no parent category. In one example, the scope property of "Root" category 20 may specify a set of users that includes all employees of a business. While not illustrated in the example of FIG. 2, it should be appreciated that some example directories may have more than one root directory.

In the example of FIG. 2, directory 12 also includes a "Research" category 22 and an "Investments" category 24. "Research" category 22 and "Investments" category 24 are "descendant" categories of "Root" category 20. Specifically, "Research" category 22 and "Investments" category 24 are "child" categories of "Root" category 20 because there are no intervening categories between "Research" category 22 and "Root" category 20 and no intervening categories between "Investments" category 24 and "Root" category 20. In other words, "Root" category 20 is an "ancestor" category of "Research" category 22 and "Investments" category 24. Specifically, "Root category" category 20 is a "parent" category of "Research" category 22 and "Investments" category 24 because there are no intervening categories between "Research" category 22 and "Root" category 20 and no intervening categories between "Investments" category 24 and "Root" category 20.

In the example in which the scope property of "Root" category 20 specifies a set of users that includes all employees of a business, the scope property of "Research" category 22 may specify a set of users that includes ones of the employees of the business that are in a "Research" division of the business and the scope property of "Investments" category 22 may specify a set of users that includes ones of the employees of the business that are in an "Investments" division of the business.

Furthermore, in the example of FIG. 2, directory 12 includes a "Real Estate Investments" category 26. "Real Estate Investments" category 26 is a child category of "Investments" category 24. In the context of the previous example, the scope property of "Real Estate Investments" category 26 may specify a set of users that includes ones of the employees of the business that are in the "Investments" division of the business that also work on real estate investments. Note that the scope property of "Real Estate Investments" category 26 may not specify a set of users that includes users that are not included in the set of users specified by the scope property of "Research" division 22. This is because the scope property of a child category specifies a subset of the set of users specified by the scope property of the child category's parent category.

In the example of FIG. 2, directory 12 includes a conference "A" 28, a conference "B" 30, a conference "C" 32, a conference "D" 34, and a conference "E" 36. Conference "A" 28 is a child of "Research" category 22. Conference "B" 30 is also a child of "Research" category 22. Conference "C" is a child of "Real Estate Investments" category 26. Conference "D" is a child of "Investments" category 24. Conference "E" is a child of "Root" category 20.

Figure 3:
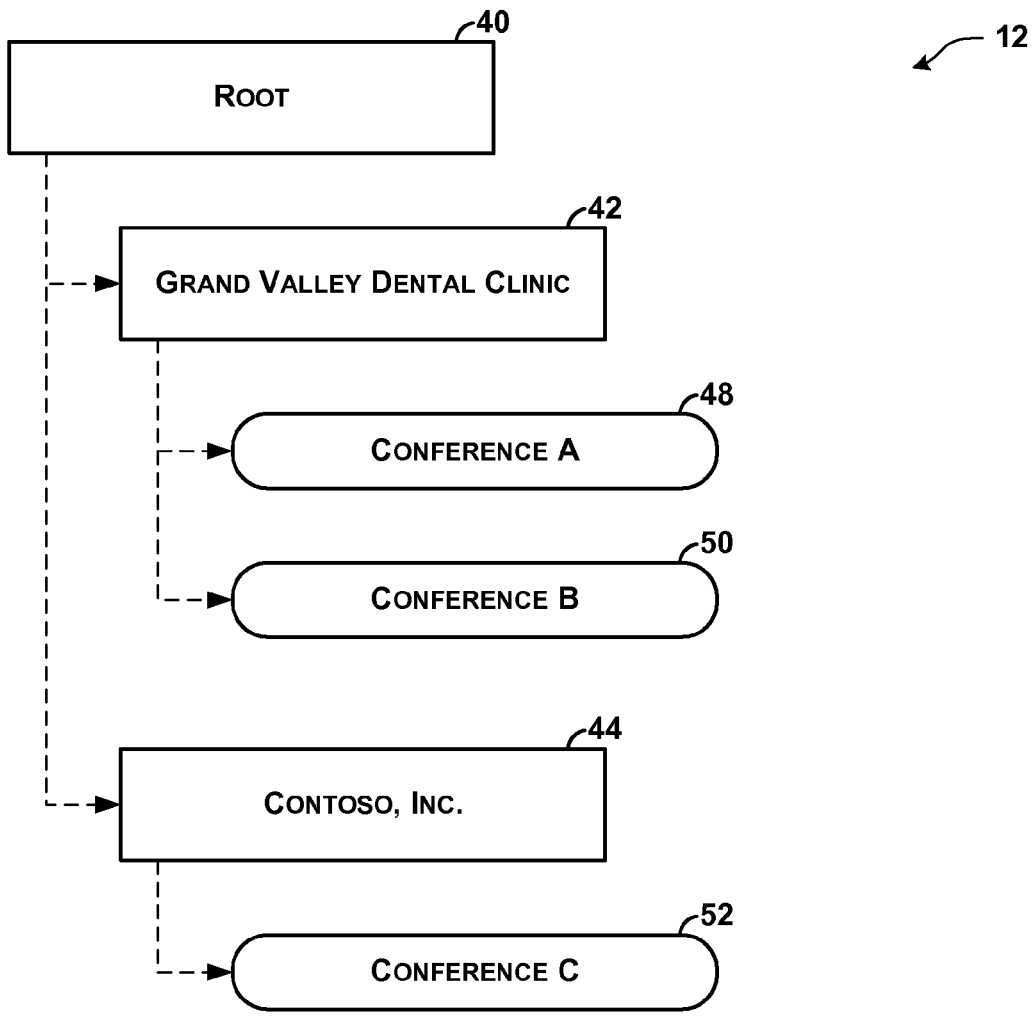
FIG. 3 illustrates a second example instance of a directory.

As discussed above, server system 4 may use directory 12 to identify conferences that a user is allowed to join. In the example of FIG. 2, if the user is in the set of users specified by the scope property of "Real Estate Investments" category 26, server system 4 may identify conference "C" 32, conference "D" 34, and conference "E" 36 as conferences that the user is allowed to join. If the user is in the set of users specified by the scope property of "Investments" category 24, but not in the set of users specified by the scope property of "Real Estate Investments" category 26, server system 4 may identify conference "D" 34 and conference "E" 36 as conferences that the user is allowed to join. If the user is in the set of users specified by the scope property of "Research" category 22, server system 4 may identify conference "A" 28, conference "B" 30, and conference "E" 36 as conferences that the user is allowed to join. If the user is in the set of users specified by the scope property of the "Root" category, but not in the sets of users specified by the scope property of "Research" category 22 or the scope property of "Investments" category 24, server system 4 may identify conference "E" 36 as the only conference that the user is allowed to join. It should be noted that the managers of conference "A" 28, conference "B" 30, conference "C" 32, conference "D" 34, and conference "E" 36 may configure the user lists of these conferences to exclude the user FIG. 3 illustrates a second example instance of directory 12. In the example of FIG. 3, directory 12 is structured to implement a shared hosting model for a plurality of organizations. In this shared hosting model a third-party service provider uses server system 4 to provide unified communications services for the plurality of organizations.

As illustrated in the example of FIG. 3, directory 12 includes a "Root" category 40. "Root" category 40 is the root category of directory 12 because "Root" category 40 has no parent category. In the example of FIG. 3, the scope property of "Root" category 40 may specify a set of users that includes all employees of two separate businesses: "Grand Valley Dental Clinic" and "Contoso, Inc."

These two businesses may have entered separate contracts with a third-party service provider that operates server system 4. The contract between "Grand Valley Dental Clinic" and the service provider may obligate the service provider to provide unified communications services for "Grand Valley Dental Clinic" and the contract between "Contoso, Inc." and the service provider may obligate the service provider to provide unified communications services for "Contoso, Inc." In exchange, the contracts may obligate "Grand Valley Dental Clinic" and "Contoso, Inc." to pay fees to the service provider. By entering these contracts with the service provider, "Grand Valley Dental Clinic" and "Contoso, Inc." may be relieved of the burden of building and maintaining their own unified communications systems. Being relieved of the burden of building and maintaining their own unified communications system may be especially valuable to small businesses that do not possess technical expertise.

In order to effectively provide unified communications system services to multiple customers, the service provider may be able to structure directory 12 to make it appear to each customer as if the service provider is only providing the unified communications system to them. In the example of FIG. 3, the service provider may be able to structure directory 12 to make it appear to "Grand Valley Dental Clinic" that the service provider is providing the unified communications system exclusively to "Grand Valley Dental Clinic." At the same time, the service provider may be able to structure directory 12 to make it appear to "Contoso, Inc." that the service provider is providing the unified communications system exclusively to "Contoso, Inc."

Accordingly, in the example of FIG. 3, the service provider has created a "Grand Valley Dental Clinic" category 42 and a "Contoso, Inc." category 44. In addition, the service provider may set the scope property of "Grand Valley Dental Clinic" category 42 to specify a set of users that includes all employees of the "Grand Valley Dental Clinic" and none of the employees of "Contoso, Inc." Similarly, the service provider may set the scope property of "Contoso, Inc." category 44 to specify a set of users that includes all employees of "Contoso, Inc." and none of the employees of "Grand Valley Dental Clinic." Furthermore, in the example of FIG. 3, the service provider has configured "Grand Valley Dental Clinic" category 42 to include a conference "A" 48 and a conference "B" 50. Because conference "A" 48 and conference "B" 50 are included in "Grand Valley Dental Clinic" category 42, only users specified by the scope property of "Grand Valley Dental Clinic" category 42 are allowed to communicate in conference "A" 48 and conference "B" 50 (i.e., the employees of "Grand Valley Dental Clinic"). In the example of FIG. 3, the service provider has configured "Contoso, Inc." category 44 to include a conference "C" 52. Because conference "C" 52 is included in "Contoso, Inc." category 44, only users specified by the scope property of "Contoso, Inc." category 44 are allowed to communicate in conference "C" 52 (i.e., the employees of "Contoso, Inc."). In this way, the employees of "Contoso, Inc." may be prevented from communicating with the employees of "Grand Valley Dental Clinic".

Figure 4:
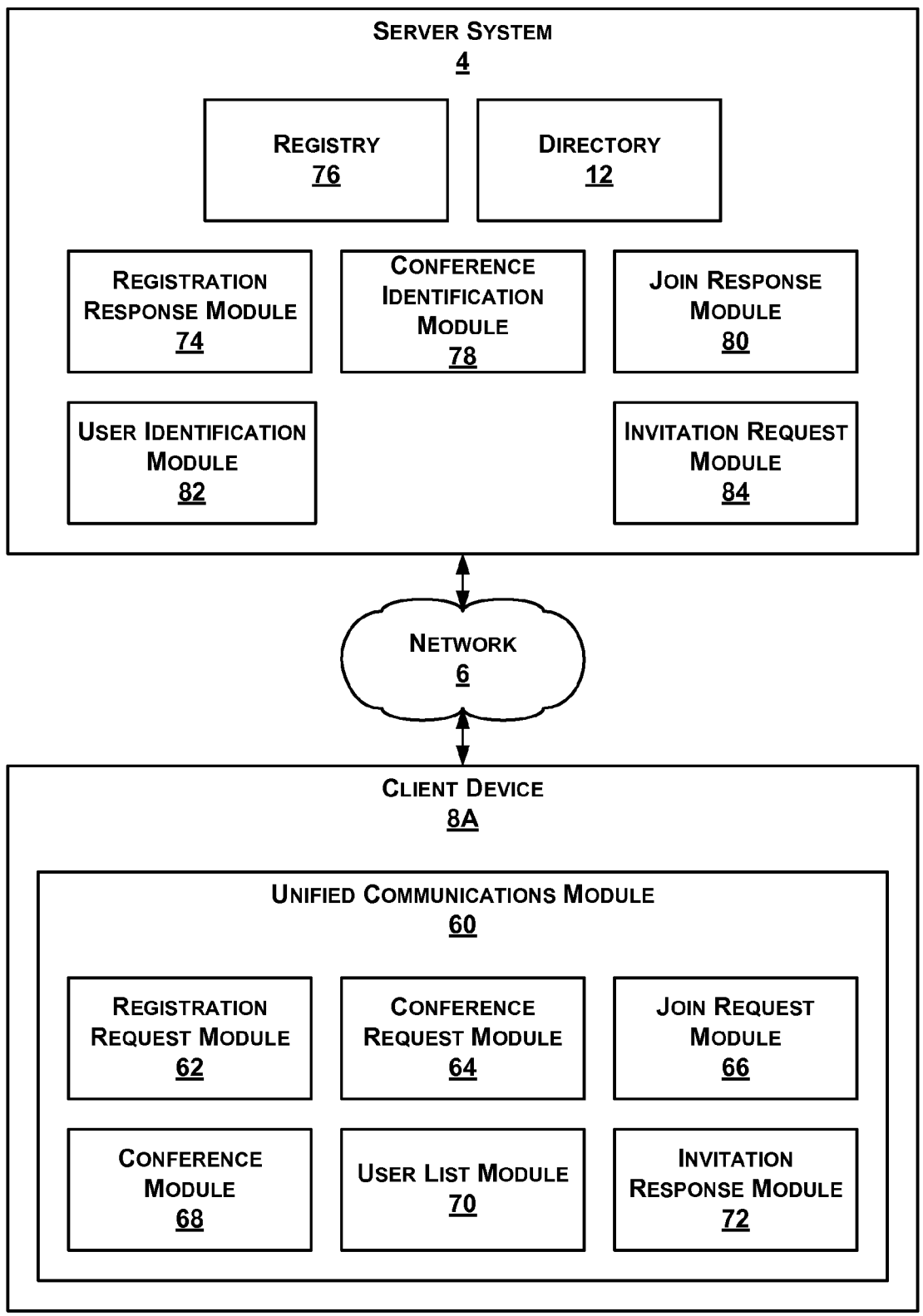
FIG. 4 is a block diagram illustrating details of an example client device and an example server system.

FIG. 4 is a block diagram illustrating example details of server system 4 and client device 8A. It should be appreciated that client devices 8B-8N may include details similar to those of client device 8A as illustrated in the example of FIG. 4.

As illustrated in the example of FIG. 4, client device 8A includes a unified communications module 60. In general terms, unified communications module 60 enables client device 8A to operate as a part of unified communications system 2. In the example of FIG. 4, unified communications module 60 is subdivided into several sub-modules. Specifically, in the example of FIG. 4, unified communications module 60 is subdivided into a registration request module 62, a conference request module 64, a join request module 66, a conference module 68, a user list module 70, and an invitation response module 72.

Furthermore, as illustrated in the example of FIG. 4, server system 4 includes directory 12, a registration response module 74, a registry 76, a conference identification module 78, a join response module 80, a user identification module 82, and an invitation request module 84.

Registration request module 62 interacts with server system 4 to register user 10A with server system 4. For example, when user 10A begins interacting with client device 8A, registration request module 62 may prompt user 10A to enter one or more identification credentials that identify user 10A. For instance, registration request module 62 may prompt user 10A to enter a username and password. In another instance, registration request module 62 may prompt user 10A to provide a biometric indicator, such as a fingerprint or a retinal scan. After registration request module 62 prompts user 10A to enter the identification credentials, registration request module 62 may receive the identification credentials from user 10A or another source. Once registration request module 62 has received the identification credentials, registration request module 62 may generate a registration request that specifies the identification credentials. Registration request module 62 may then send the registration request to server system 4 through a secure communications channel. For instance, registration request module 62 may send the registration request to server system 4 using the Transport Layer Security (TLS) protocol, the Secure Sockets Layer (SSL) protocol, the IP-Sec protocol, a virtual private network protocol, or another type of secure communications protocol.

When server system 4 receives the registration request, registration response module 74 in server system 4 may verify the identification credentials specified by the registration request. For instance, if the identification credentials include a username and a password, registration response module 74 may determine whether the username is stored in a list of registered usernames and, if so, whether the password corresponds to the username. If registration response module 74 is unable to successfully verify the identification credentials specified by the registration request, registration response module 74 may send to client device 8A a response indicating that server system 4 was unable to successfully verify the identification credentials specified by the registration request.

If registration response module 74 successfully verifies the identification credentials specified by a registration request sent by client device 8A, registration response module 74 may create an entry in registry 76 that maps user 10A to client device 8A. Furthermore, if registration response module 74 successfully verifies the identification credentials specified by the registration request, registration response module 74 may generate a globally unique identifier ("GUID"). Registration response module 74 may then send the GUID to registration request module 62 in client device 8A. Subsequently, client device 8A may use the GUID in communications with server system 4, thereby alerting server system 4 that the communications are associated with user 10A. In this way, registration request module 62 registers at server system 4 that user 10A is the user of client device 8A.

After user 10A is registered at server system 4 as the user of client device 8A, conference request module 64 in client device 8A sends a request for a list of conferences to server system 4. In some implementations, conference request module 64 may be configured to automatically send the request for the list of conferences to server system 4. In other implementations, conference request module 64 may be configured to send the request for the list of conferences to server system 4 in response to input from user 10A.

When server system 4 receives the request for the list of conferences, conference identification module 78 in server system 4 uses directory 12 to identify conferences that user 10A is allowed to join. For example, conference identification module 78 may identify categories in directory 12 that have scope properties that specify sets of users that include user 10A. In this example, conference identification module 78 may then identify conferences in the identified categories that have user lists that include user 10A. Applying this example to the example directory illustrated in FIG. 2, conference identification module 78 may, for instance, identify "Real Estate Investments" category 26, "Investments" category 24, and "Root" category 20 as categories that have scope properties that specify sets of users that include user 10A. In this example, if conference "C" 32 and conference "E" 36 have user lists that include user 10A and if conference "D" 34 has a user list that does not include user 10A, conference identification module 78 may then identify conference "C" 32 and conference "E" 36, but not conference "D" 34. Note that in this example, conference identification module 78 identifies "Investments" category 24 and "Root" category 20 because the set of users specified by the scope property of "Real Estate Investments" category 26 is a subset of the set of users specified by the scope property of "Investments" category 24, which is a subset of the users specified by the scope property of "Root" category 20. In a second example, conferences may not be associated is user lists. In this second example, conference identification module 78 may identify conferences that user 10A is allowed to join by identifying categories that have scope properties that specify sets of users that include user 10A. In this second example, conference identification module 78 may then identify all conferences in the identified categories.

After conference identification module 78 identifies the conferences that user 10A is allowed to join, conference identification module 78 sends to client device 8A a list of the conferences that user 10A is allowed to join. When client device 8A receives the list of the conferences that user 10A is allowed to join, conference request module 64 may, in some implementations, present the list of the conferences that user 10A is allowed to join to user 10A. For example, conference request module 64 may present a graphical user interface that displays the list of the conferences that user 10A is allowed to join. In a second example, conference request module 64 may use voice synthesis to vocalize names of each of the conferences that user 10A is allowed to join. This second example may be useful when client device 8A is a telephone.

After conference request module 64 receives the list of conferences that user 10A is allowed to join, join request module 66 may send to server system 4 a request to join a conference. In a first set of example configurations, join request module 66 may send the request to join a conference when user 10A selects the conference from the list of the conferences that user 10A is allowed to join. In a second set of example configurations, join request module 66 may automatically send the request to join a conference in the list of the conferences that user 10A is allowed to join. In a third set of example configurations, join request module 66 may send the request to join a conference in response to input from user 10A. In this third set of example configurations, the conference may or may not be included in the list of conferences that user 10A is allowed to join. For instance, user 10A could explicitly name a conference that user 10A wishes to join.

When server system 4 receives a request to join a conference, join response module 80 in server system 4 determines whether user 10A is allowed to join the conference. In some example configurations, join response module 80 may check directory 12 to determine whether the set of users specified by the scope property of a category that contains the conference includes user 10A and may check directory 12 to determine whether a user list of the conference includes user 10A. If join response module 80 determines that user 10A is not allowed to join the conference, join response module 80 may reject the request to join the conference. If join response module 80 determines that user 10 is allowed to join the conference, join response module 80 may send to client device 8A conference information that enables client device 8A to join the conference. For instance, join response module 80 may send to client device 8A an encryption key that enables client device 8A to decrypt communications occurring in the conference. Determining whether user 10A is allowed to join the conference when server system 4 receives the request to join the conference may prevent user 10A from joining a conference that user 10A is not allowed to join by explicitly naming the conference.

If client device 8A receives the conference information that enables client device 8A to join the conference, conference module 68 in client device 8A enables user 10A to communicate with other users in the conference. Conference module 68 may enable user 10A to communicate with other users in the conference in a variety of ways. For instance, conference module 68 may present a variety of different types of user interfaces for different modes of communication occurring in the conference. For example, conference module 68 may present a chat room interface if chat communication is occurring in the conference. In another example, conference module 68 may present a video screen interface if video conferencing communication is occurring in the conference. Furthermore, the types of user interfaces presented may depend on what type of device client device 8A is. For instance, if client device 8A is a telephone, client device 8A may only present an audio interface even when video conferencing communication is occurring in the conference. In some instances, conference module 68 may enable user 10A to communicate simultaneously with the other users in the selected conference using multiple media, e.g., video conferencing and instant messaging.

After conference module 68 uses the information to join the conference, user 10A may begin using communicating in the conference. For example, if audio communication is occurring in the conference, conference module 68 may receive audio input from user 10A speaking into a microphone and may forward this audio input to directly or indirectly to other uses participating in the conference. Furthermore, in this example, conference module 68 may receive audio signals from other users participating in the conference and may output these audio signals on a speaker.

Furthermore, if user 10A is allowed to join the conference, user identification module 82 may use directory 12 to identify users who are allowed to join the conference. For example, if user 10A is allowed to join conference "D" 34 in the example directory illustrated in FIG. 2, user identification module 82 may identify other users who are in the user list of conference "D" 34. After user identification module 82 identifies the users who are allowed to join the conference, user identification module 82 may send a list of the identified users to client device 8A. User identification module 82 may also send presence information regarding each of the identified users to client device 8A. As discussed above, the presence information regarding a user indicates an availability state of the user.

When client device 8A receives the list of the identified users, user list module 70 may present the list of the identified users. Subsequently, user list module 70 may receive user selection input from user 10A. The user selection input may indicate that user 10A wishes to invite one of the identified users to join the conference. When user list module 70 receives the user selection input, user list module 70 sends a request to server system 4 to invite the user indicated by the user selection input to join the conference.

Upon receiving a request to invite a user to join a conference, invitation request module 84 in server system 4 may use registry 76 to identify which one of client devices 8 is currently being used by the invited user. Invitation request module 84 may then send an invitation to join the conference to the invited user's client device. For instance, if user 10A is the invited user, invitation request module 84 may identify client device 8A as the one of client device 8 that is currently being used by user 10A and may send an invitation to client device 8A.

When client device 8A receives an invitation to join a conference, invitation response module 72 in client device 8A may notify user 10A of the invitation. Client device 8A may notify user 10A of the invitation in a variety of ways depending on the capabilities of the device used by the user and the types of communication occurring in the conference. For instance, if client device 8A is a voice-only telephone and voice communication is occurring in the conference, invitation response module 72 may cause client device 8A to audibly output a ring tone and/or vibrate. In another instance, if client device 8A is a personal computer and video conferencing is occurring in the conference, invitation response module 72 may display on a monitor of client device 8A a message describing the invitation to join the conference.

User 10A may accept or decline an invitation to join a conference. If user 10A accepts the invitation to join the conference, invitation response module 72 may send to server system 4 a message that indicates that user 10A accepted the invitation to join the conference. In response, invitation request module 84 sends to client device 8A information that enables client device 8A to join the conference. When device 8A receives that information that enables client device 8A to join the conference, conference module 68 may use the information to join the conference. After conference module 68 uses the information to join the conference, user 10A may begin communicating in the conference.

If user 10A declines the invitation to join the conference, invitation response module 72 may send to server system 4 a message that indicates that user 10A has declined the invitation to join the conference. When server 4 receives the message that indicates that user 10A has declined the invitation to join the conference, invitation request module 84 does not send to client device 8A information that enables client device 8A to join the conference.

Figure 5:
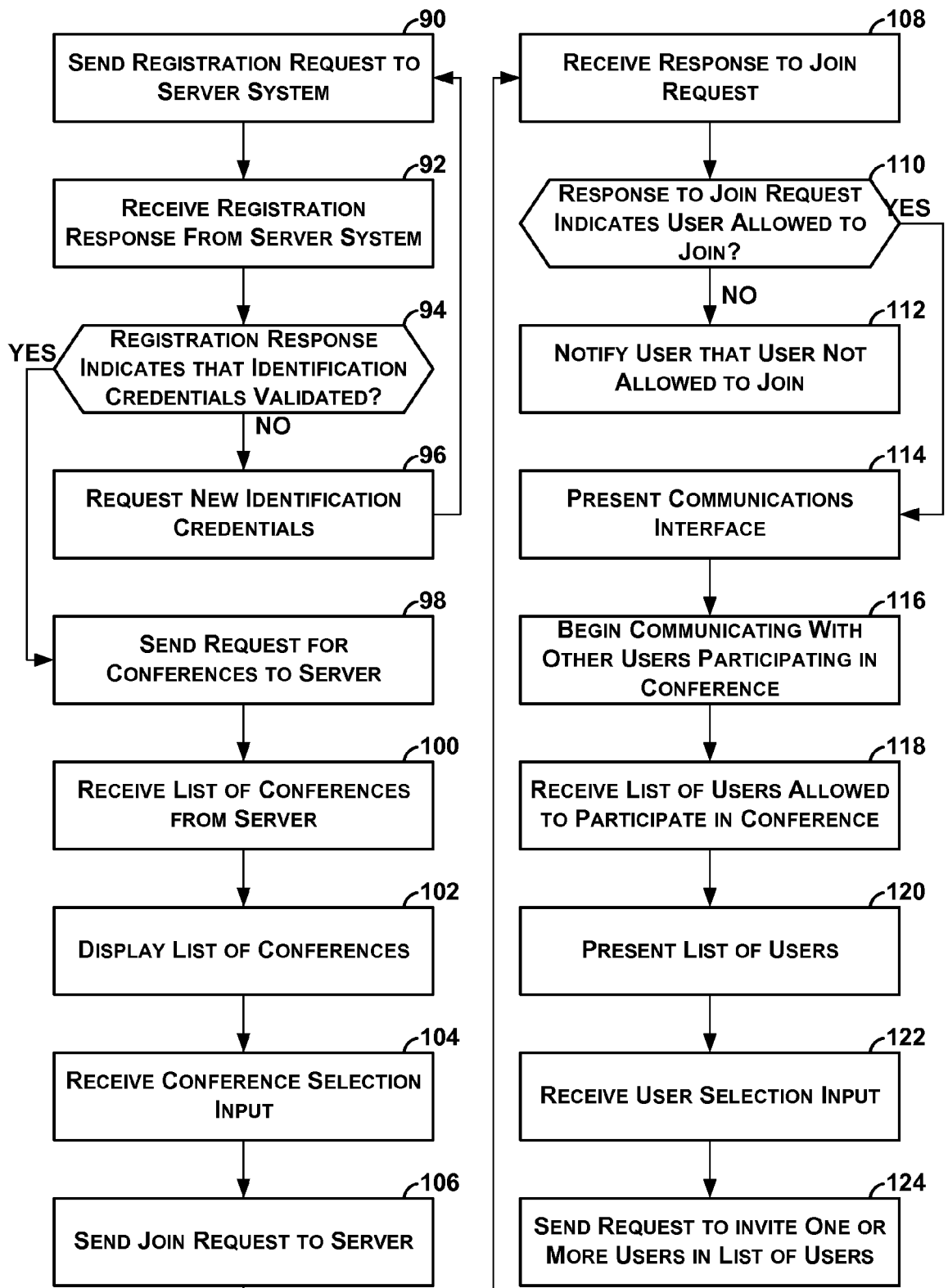
FIG. 5 is a flowchart illustrating an example operation of the client device.

FIG. 5 is a flowchart illustrating an example operation of client device 8A. It should be understood that one or more of client devices 8B through 8N may also perform the example operation illustrated in FIG. 5.

The example operation of FIG. 5 begins when registration request module 62 sends a registration request to server system 4 (90). As discussed above, the registration request may specify identification credentials that identify user 10A as the user of client device 8A. Subsequently, registration request module 62 receives a registration response from server system 4 (92). Registration request module 62 may then determine whether the registration response indicates that server system 4 successfully validated the identification credentials specified by the registration request (94). If registration request module 62 determines that the registration response indicates that server system 4 did not successfully validate the identification credentials specified by the registration request ("NO" of 94), registration request module 62 may request new identification credentials from user 10A (96). Registration request module 62 may then loop back and send a registration request that specifies the new identification credentials (90).

On the other hand, if registration request module 62 determines that the registration response indicates that server system 4 successfully validated the identification credentials specified by the registration request ("YES" of 94), conference request module 64 sends to server system 4 a request for a list of conferences (98). In response to the request for the list of conferences, conference request module 64 may receive a list of conferences that user 10A is allowed to join (100). As discussed above, user 10A may, for example, be allowed to join a conference when the category that includes the conference has a scope property that specifies a set of users that includes user 10A and the conference has a user list that includes user 10A. After conference request module 64 receives the list of conferences that user 10A is allowed to join, conference request module 64 may present the list of conferences that user 10A is allowed to join (102).

After conference request module 64 presents the list of conferences, join request module 66 may receive conference selection input from user 10A (104). The conference selection input may indicate that user 10A wishes to join one of the conferences presented in the list of conferences that user 10A is allowed to join. In response to receiving the conference selection input, join request module 66 may send to server system 4 a request to join the conference indicated by the conference selection input (106).

Subsequently, join request module 66 may receive from server system 4 a response to the request to join the conference (108). Join request module 66 may then determine whether the response to the request to join the conference indicates that user 10A is allowed to join the conference (110). If the response to the request to join the conference indicates that user 10A is not allowed to join the conference ("NO" of 110), join request module 66 may notify user 10A that user 10A is not allowed to join the conference (112).

On the other hand, if the response to the request to join the conference indicates that user 10A is allowed to join the conference ("YES" of 110), conference module 68 may present a user interface (114). As discussed above, the user interface may be appropriate for the type or types of communications occurring in the conference. After conference module 68 presents the user interface, user 10A may begin communicating with other users participating in the conference (116).

Furthermore, conference module 68 may receive from server system 4 a list of users who are allowed to participate in the conference (118). For example, the list of users may include users that are in the set of users specified by the user list of the conference. For example, conference module 68 may receive from server system 4 a list that indicates that "Greg P", "Sam Q", and "Nina H" are allowed to participate in the conference. After receiving the list of users who are allowed to participate in the conference, conference module 68 may present the list of users who are allowed to participate in the conference (120).

Subsequently, conference module 68 may receive from user 10A user selection input that indicates one or more of the users from the list of users who are allowed to participate in the conference (122). In response to receiving the user selection input, conference module 68 may send to server system 4 a request to invite the users indicated by the user selection input to join the conference (124).

Figure 6:
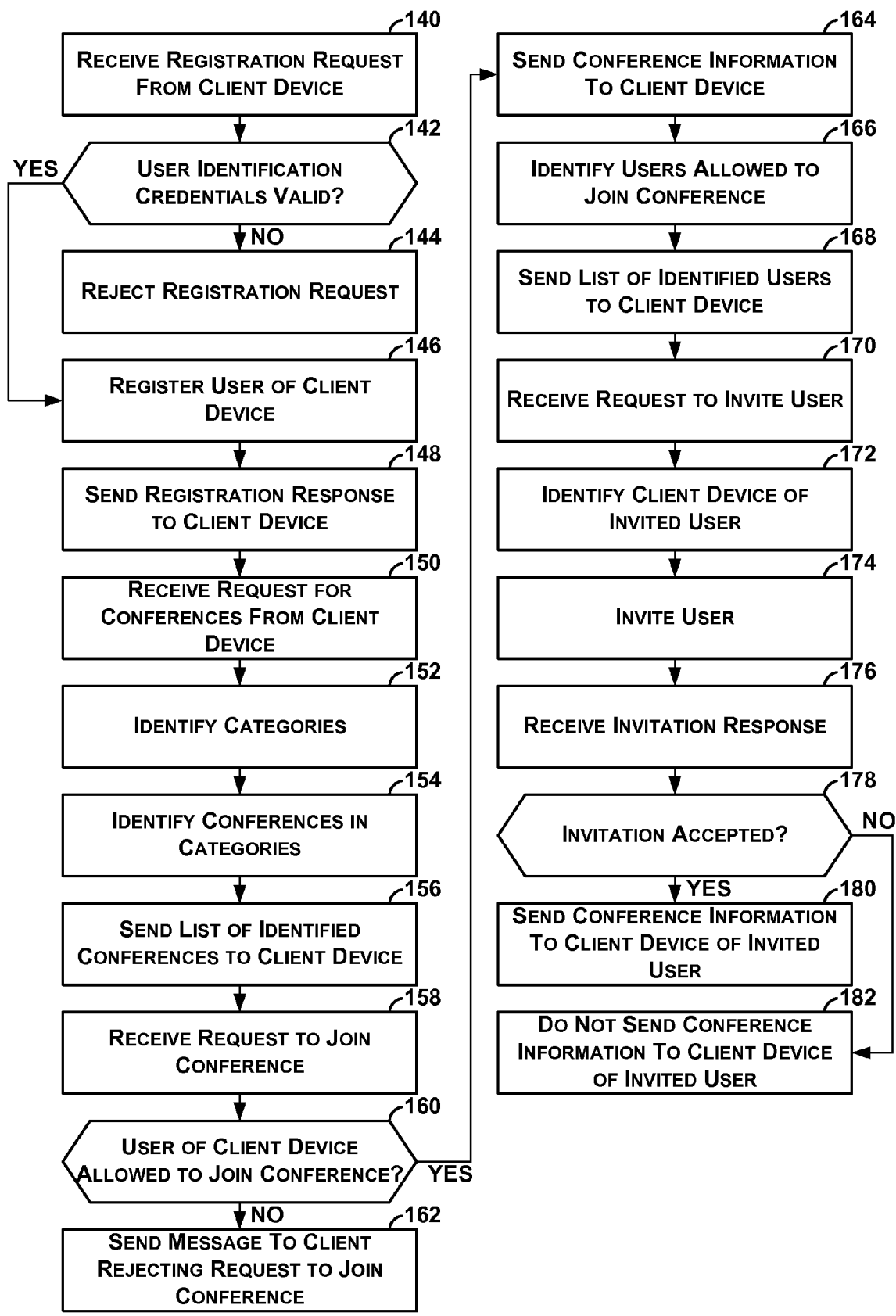
FIG. 6 is a flowchart illustrating an example operation of the server device.

FIG. 6 is a flowchart illustrating an example operation of server system 4. Although the operation illustrated in FIG. 6 is explained with reference to server system 4 receiving information from client device 8A and sending information to client device 8A, it should be appreciated that server system 4 may receive information from or send information to any of client devices 8.

As illustrated in the example of FIG. 6, registration response module 74 may receive a registration request from client device 8A (140). When registration response module 74 receives the registration request, registration response module 74 may determine whether identification credentials specified by the registration request are valid (142). For instance, registration response module 74 may determine whether a username specified in the registration request corresponds to a password specified in the registration request. If registration response module 74 determines that the identification credentials specified by the registration request are not valid ("NO" of 142), registration response module 74 may reject the registration request and send a registration response that indicates that server system 4 did not successfully validate the identification credentials specified by the registration request (144).

If registration response module 74 determines that the user identification credentials specified by the registration request are valid ("YES" of 142), registration response module 74 may update registry 76 to register the user specified by the registration request (i.e., user 10A) as the user of client device 8A (146). Next, registration response module 74 may send a registration response to client device 8A that indicates that server system 4 successfully validated the identification credentials specified by the registration request (148). If registration response module 74 determines that the user identification credential specified by the registration request are valid, the registration response may, in some example implementations, include a GUID that client device 8A may use to identify further communications from client device 8A to server system 4.

Subsequently, conference identification module 78 in server system 4 may receive a request for a list of conferences from client device 8A (150). In response to the request for the list of conferences, conference identification module 78 may use directory 12 to identify categories that have scope properties that specify sets of users that include user 10A (152). Conference identification module 78 may then use directory 12 to identify conferences in the identified categories that have user lists that include user 10A (154). In this way, conference identification module 78 identifies conferences that user 10A is allowed to join. After identifying the conferences that user 10A is allowed to join, conference identification module 78 may send to client device 8A a list of the conferences that user 10A is allowed to join (156).

After conference identification module 78 sends to client device 8A the list of the conferences that user 10A is allowed to join, join response module 80 may receive from client device 8A a request to join a conference (158). Upon receiving the request to join the conference, join response module 80 may use directory 12 to determine whether user 10A (i.e., the user of client device 8A) is allowed to join the conference (160). If user 10A is not allowed to join the conference ("NO" of 160), join response module 80 may send to client device 8A a message that indicates that user 10A is not allowed to join the conference (162).

On the other hand, if user 10A is allowed to join the conference ("YES" of 160), join response module 80 may send conference information to client device 8A (164). The conference information enables client device 8A to join the conference.

In addition, user identification module 82 may use directory 12 to identify other users that are allowed to join the conference (166). After identifying the other users that are allowed to join the conference, user identification module 82 may send to client device 8A a list of the identified users who are allowed to join the conference (168).

Subsequently, invitation request module 84 may receive from client device 8A a request to invite a user (170). In response to the request to invite the user, invitation request module 84 may use registry 76 to identify the client device associated with the invited user (172). Next, invitation request module 84 may send an invitation to the client device associated with the invited user (174).

Invitation request module 84 may then receive an invitation response from the client device associated with the invited user (176). Upon receiving the invitation response, invitation request module 84 determines whether the invitation response indicates that the invited user accepted the invitation to join the conference (178). If invitation request module 84 determines that the invitation response indicates that the user accepted the invitation to join the conference ("YES" of 178), invitation request module 84 sends to the client device associated with the invited user conference information that enables the client device associated with the invited user to join the conference (180). If invitation request module 84 determines that the invitation response indicates that the user did not accept the invitation to join the conference ("NO" of 178), invitation request module 84 does not send conference information that enables the client device associated with the invited user to join the conference (182).

Figure 7:
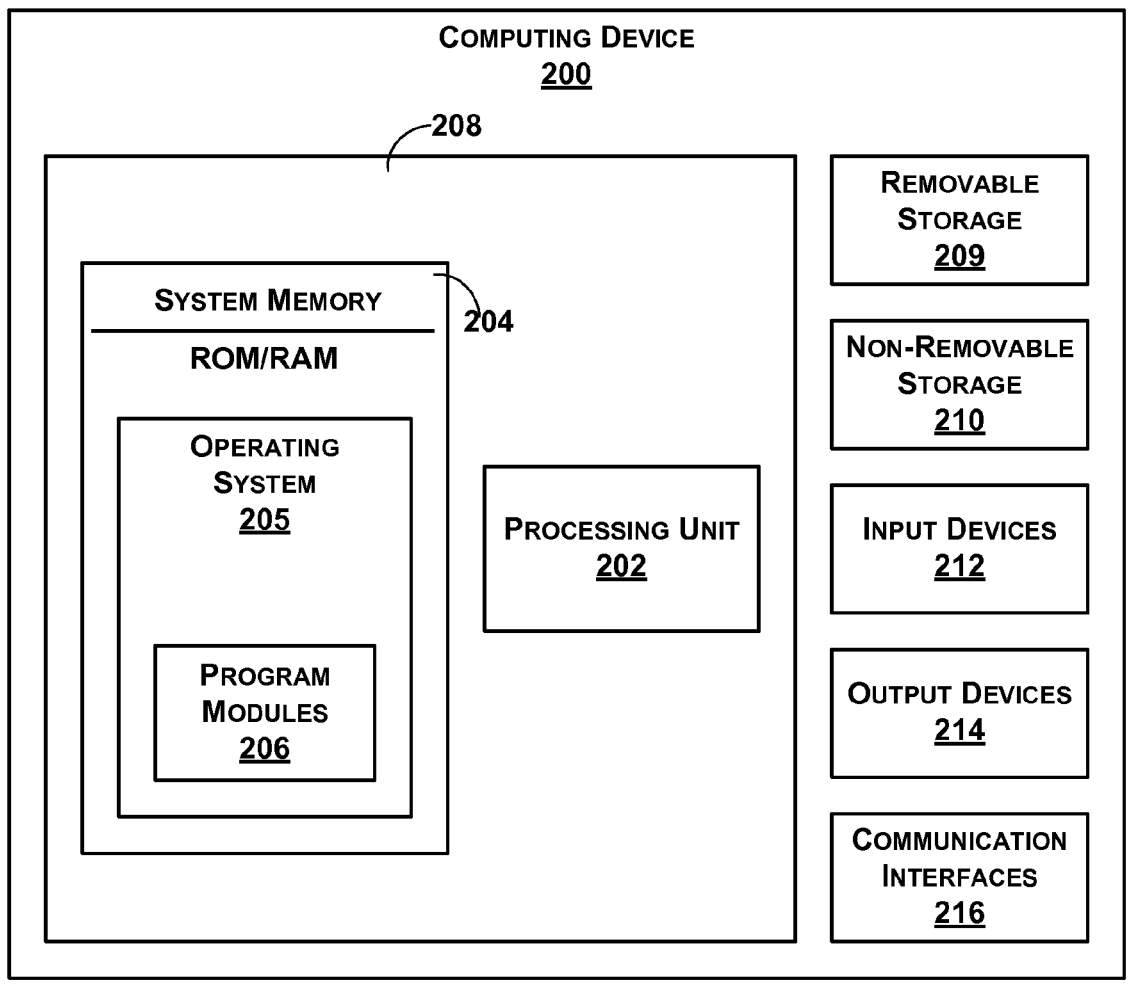
FIG. 7 is a block diagram illustrating an example implementation of a computing device.

FIG. 7 illustrates an example computing device 200 that may embody server system 4 and/or client devices 8. As illustrated in the example of FIG. 7, computing device 200 includes at least one processing unit 202 and a system memory 204. Depending on the exact configuration and type of computing device, system memory 204 may be volatile (such as RAM), non-volatile (such as ROM, flash memory, etc.) or some combination of the two. System memory 204 typically includes an operating system 205 and one or more program modules 206 working within operating system 205. This disclosure has described several features of client device 8A and server system 4 as "modules." It should be appreciated that the functionality of such "modules" may be implemented through an interaction between hardware and software. For instance, the functionality of modules may occur when processing unit 202 executes instructions in one of program modules 206. Alternatively, the functionality of such "modules" may be implemented as hardware.

Computing device 200 may have additional features or functionality. For example, computing device 200 may also include additional data storage devices (removable and/or non-removable) such as, for example, magnetic disks, optical disks, or tape. Such additional storage is illustrated in the example of FIG. 7 by removable storage 209 and non-removable storage 210. Computer-readable storage media may include volatile and nonvolatile, removable and non-removable media implemented in any method or technology for storage of information, such as computer readable instructions, data structures, program modules, or other data.

System memory 204, removable storage 209 and non-removable storage 210 are all examples of computer-readable storage media. Example types of computer-readable storage media include, but are not limited to: Random Access Memory (RAM), Read-Only Memory (ROM), Electrically-Erasable Programmable Read-Only Memory (EEPROM), flash memory, or other memory technology, CD-ROM, digital versatile discs (DVD) or other optical storage, magnetic cassettes, magnetic tape, magnetic disk storage or other magnetic storage devices, or any other types of media which can be used to store the desired information and which can be accessed by computing device 200. Any such computer-readable storage media may be part of computing device 200. Computing device 200 may also have one or more input devices 212 such as keyboards, mice, pens, voice input devices, touch input devices, and other types of input devices. Computing device 200 may also include one or more output devices 214 including monitors, displays, speakers, printers, and other types of output devices.

Computing device 200 also contains one or more communication interfaces 216 that allow computing device 200 to communicate with other computing devices. For instance, one or more of communication interfaces 216 may enable computing device 200 to communicate with other computing devices via network 6.

It is to be understood that the implementations described herein may be implemented by hardware, software, firmware, middleware, microcode, or any combination thereof. When the systems and/or methods are implemented in software, firmware, middleware or microcode, program code or code segments, they may be stored in a computer-readable storage medium, such as a storage component. A code segment may represent a procedure, a function, a subprogram, a program, a routine, a subroutine, a module, a software package, a class, or any combination of instructions, data structures, or program statements A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes and instructions may be stored in computer-readable storage media and executed by processors. The memory unit may be implemented within the processor or external to the processor, in which case it can be communicatively coupled to the processor via various means as is known in the art.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
  receiving a registration request from a first client device, the registration request specifying an identification credential of a first user;
  determining whether the identification credential of the first user is valid;
  registering the first user as a user of the first client device when the identification credential of the first user is valid;
  after the first user is registered as the user of the first client device, receiving a request from the first client device for a list of unified communications conferences that the first user is allowed to join;
  in response to receiving the request for the list of unified communications conferences that the first user is allowed to join, identifying applicable categories in a directory, the directory comprising a plurality of categories organized as a hierarchy, each category in the directory specifying a set of users,
    wherein each of the sets of users specified by the applicable categories includes the first user,
    wherein, for each category in the directory other than a root category, the set of users specified by the category is a subset of the set of users specified by the category's parent category;
  identifying unified communications conferences that are included in the applicable categories and that have user lists that include the first user,
    wherein, for each of the unified communications conferences, the user list of the unified communications conference is a subset of the set of users specified by the category that includes the unified communications conference;
  including the identified unified communications conferences in the list of unified communications conferences that the first user is allowed to join;
  sending, to the first client device, the list of the unified communications conferences that the first user is allowed to join;
  receiving, from the first client device, a request to join a selected unified communications conference in a first category, the first category being one of the categories in the directory;
  in response to the request to join the selected unified communications conference, determining, at a server system, whether the first user is in the set of users specified by the first category and whether the first user is in the user list of the selected unified communications conference;
  sending conference information to the first client device when the first user is in the set of users specified by the first category and the first user is in the user list of the selected unified communications conference, thereby enabling the first user to communicate in the selected unified communications conference;
  sending to the first client device a list of users that are in the set of users specified by the first category, the list of users including a second user;
  receiving, from the first client device, a request to invite the second user to join the selected unified communications conference;
  identifying a second client device as a client device used by the second user;
  sending to the second client device an invitation to join the selected unified communications conference;
  receiving, from the second client device, an invitation response;
  determining whether the invitation response indicates that the second user has accepted the invitation; and
  sending the conference information to the second client device, thereby enabling the second user to communicate in the selected unified communications conference.

2. The method of claim 1, wherein the method further comprises sending, to the first client device, presence information regarding users in the set of users specified by the first category, the presence information indicating availability states of the users in the set of users specified by the first category.

3. The method of claim 1,
  wherein the method further comprises:
    receiving a second registration request, the second registration request specifying an identification credential of the second user;
    determining whether the identification credential of the second user is valid;
    generating an entry in a registry to register the second user as a user of the second client device when the identification credential of the second user is valid; and
    in response to receiving the request to invite the second user, using the entry in the registry to identify the second client device as being used by the second user; and
  wherein sending the conference information to the second client device comprises sending the conference information to the second client device after the second client device is identified as the client device being used by the second user.

4. The method of claim 1,
  wherein the first category is associated with a first organization and a second category is associated with a second organization, the second category being one of the categories in the directory, and
  wherein the second category is not an ancestor of the first category or a descendant of the first category.

5. The method of claim 1, wherein the directory is a Lightweight Directory Access Protocol (LDAP) directory.

6. The method of claim 1, wherein more than one type of communication occurs in the selected unified communications conference.

7. The method of claim 1, wherein the directory is structured to implement an ethical wall between a first subdivision of an organization and a second subdivision of the organization.

8. The method of claim 7,
wherein the set of users specified by the first category is a first set of users;
the first category is a descendant of the root category;
wherein a second category in the directory is a descendant of the root category and the second category is not an ancestor of the first category or a descendant of the first category;
wherein the root category includes a second set of users in an organization, the second set of users including users in the first subdivision and users in the second subdivision;
wherein the first set of users is a subset of the second set of users, the first set of users including users that are in the first subdivision and are not in the second subdivision; and
wherein the second category to specifies a third set of users, the third set of users being a subset of the second set of users, the second set of users including users that are in the second subdivision and are not in the first subdivision.

9. A device comprising:
a processing unit; and
a system memory that stores instructions that, when executed by the processing unit, cause the device to:
receive a registration request from a first client device, the registration request specifying an identification credential of a first user;
determine whether the identification credential of the first user is valid;
register the first user as a user of the first client device when the identification credential of the first user is valid;
receive, after the first user is registered as the user of the first client device, a request from the first client device for a list of unified communications conferences that the first user is allowed to join;
identify, in response to receiving the request for the list of unified communications conferences that the first user is allowed to join, applicable categories in a directory, the directory comprising a plurality of categories, each category in the directory specifying a set of users,
wherein each of the sets of users specified by the applicable categories includes the first user,
wherein the categories in the directory are organized as a hierarchy, and
wherein, for each category in the directory other than a root category, the set of users specified by the category is a subset of the set of users specified by the category's parent category;
identify unified communications conferences that are included in the applicable categories and that have user lists that include the first user,
wherein, for each of the unified communications conferences, the user list of the unified communications conference is a subset of the set of users specified by the category that includes the unified communications conference;
include the identified unified communications conferences in the list of unified communications conferences that the first user is allowed to join;
send to the first client device the list of the unified communications conferences that the first user is allowed to join;
receive, from the first client device, a request to join a selected unified communications conference in a first category, the first category being one of the categories in the directory;
determine, in response to the request to join the selected unified communications conference, whether the first user is in the set of users specified by the first category and whether the first user is in the user list of the selected unified communications conference;
send conference information to the first client device when the first user is in the set of users specified by the first category and the first user is in the user list of the selected unified communications conference, the conference information enabling the first client device to join the selected unified communications conference, thereby enabling the first user to communicate in the selected unified communications conference;
send to the first client device a list of users that are in the set of users specified by the first category, the list of users including a second user;
receive, from the first client device, a request to invite the second user to join the selected unified communications conference;
identify a second client device as a client device used by the second user;
send to the second client device an invitation to join the selected unified communications conference;
receive, from the second client device, an invitation response;
determine whether the invitation response indicates that the second user has accepted the invitation; and
send the conference information to the second client device, thereby enabling the second user to communicate in the selected unified communications conference.

10. The device of claim 9, wherein the directory is structured to implement an ethical wall between a first subdivision of an organization and a second subdivision of the organization.

11. The device of claim 9, wherein the directory is structured to implement a hosted service model for a plurality of organizations.

12. A computer-readable storage medium comprising instructions that, when executed, cause a computer system to:
receive a registration request from a first client device, the registration request specifying an identification credential of a first user;
determine whether the identification credential of the first user is valid;
register the first user as a user of the first client device when the identification credential of the first user is valid;
receive, after the first user is registered as the user of the first client device, a request from the first client device for a list of unified communications conferences that the first user is allowed to join;
identify, in response to receiving the request for the list of unified communications conferences that the first user is allowed to join, applicable categories in a directory, the directory comprising a plurality of categories, each category in the directory specifying a set of users, wherein each of the sets of users specified by the applicable categories includes the first user, wherein the categories in the directory are organized as a hierarchy, and wherein, for each category in the directory other than a root category, the set of users specified by the category is a subset of the set of users specified by the category's parent category;

identify unified communications conferences that are included in the applicable categories and that have user lists that include the first user, wherein, for each of the unified communications conferences, the user list of the unified communications conference is a subset of the set of users specified by the category that includes the unified communications conference;

include the identified unified communications conferences in the list of unified communications conferences that the first user is allowed to join;

send to the first client device the list of the unified communications conferences that the first user is allowed to join;

receive, from the first client device, a request to join a selected unified communications conference in a first category, the first category being one of the categories in the directory;

determine, in response to the request to join the selected unified communications conference, whether the first user is in the set of users specified by the first category and whether the first user is in the user list of the selected unified communications conference;

send conference information to the first client device when it is determined that the first user is in the set of users specified by the first category and the first user is in the user list of the selected unified communications conference, the conference information enabling the first client device to join the selected unified communications conference, thereby enabling the first user to communicate in the selected unified communications conference;

send to the first client device a list of users that are in the set of users specified by the first category, the list of users including a second user;

receive, from the first client device, a request to invite the second user to join the selected unified communications conference;

identify a second client device as a client device used by the second user;

send to the second client device an invitation to join the selected unified communications conference;

receive, from the second client device, an invitation response;

determine whether the invitation response indicates that the second user has accepted the invitation; and send the conference information to the second client device, thereby enabling the second user to communicate in the selected unified communications conference.

13. The computer-readable storage medium of claim 12, wherein the directory is structured to implement an ethical wall between a first subdivision of an organization and a second subdivision of the organization.

* * * * *

UNITED STATES PATENT AND TRADEMARK OFFICE
CERTIFICATE OF CORRECTION

| | | |
|---|---|---|
| PATENT NO. | : 7,739,333 B2 | Page 1 of 1 |
| APPLICATION NO. | : 12/163308 | |
| DATED | : June 15, 2010 | |
| INVENTOR(S) | : Robert W. Serr et al. | |

It is certified that error appears in the above-identified patent and that said Letters Patent is hereby corrected as shown below:

Column 22, line 4, in Claim 12, before "the first" delete "it is determined that".

Signed and Sealed this
Eighth Day of February, 2011

David J. Kappos
*Director of the United States Patent and Trademark Office*